United States Patent
Sonoda et al.

(10) Patent No.: US 12,392,110 B2
(45) Date of Patent: Aug. 19, 2025

(54) WORK MACHINE AND METHOD FOR CONTROLLING WORK MACHINE

(71) Applicant: KOMATSU LTD., Tokyo (JP)

(72) Inventors: Takuya Sonoda, Tokyo (JP); Takashi Maeda, Tokyo (JP); Yoshihide Nakae, Tokyo (JP); Yasuhisa Asano, Tokyo (JP); Takeo Murata, Tokyo (JP)

(73) Assignee: KOMATSU LTD., Tokyo (JP)

( * ) Notice: Subject to any disclaimer, the term of this patent is extended or adjusted under 35 U.S.C. 154(b) by 93 days.

(21) Appl. No.: 18/558,284

(22) PCT Filed: May 18, 2022

(86) PCT No.: PCT/JP2022/020619
§ 371 (c)(1),
(2) Date: Oct. 31, 2023

(87) PCT Pub. No.: WO2023/286442
PCT Pub. Date: Jan. 19, 2023

(65) Prior Publication Data
US 2024/0229419 A1     Jul. 11, 2024

(30) Foreign Application Priority Data
Jul. 16, 2021    (JP) ................... 2021-117774

(51) Int. Cl.
    *E02F 9/20*         (2006.01)
    *E02F 3/76*         (2006.01)

(52) U.S. Cl.
    CPC .............. *E02F 9/2087* (2013.01); *E02F 3/76* (2013.01)

(58) Field of Classification Search
    CPC .......... E02F 9/2087; E02F 3/76; E02F 9/225; B62D 7/09; B62D 6/00; B62D 1/12; B62D 1/00
(Continued)

(56) References Cited

U.S. PATENT DOCUMENTS

| 6,067,782 | A  | * | 5/2000 | Diekhans ................. B62D 5/30 56/10.2 A |
| 9,234,330 | B2 | * | 1/2016 | Sharma ................. B62D 6/003 |

(Continued)

FOREIGN PATENT DOCUMENTS

| JP | 2017-87779 A | 5/2017 |
| JP | 2020-7795 A | 1/2020 |

(Continued)

OTHER PUBLICATIONS

The International Search Report for the corresponding international application No. PCT/JP2022/020619, issued on Aug. 9, 2022.

*Primary Examiner* — Logan M Kraft
*Assistant Examiner* — Anthony Donald Taylor, Jr.
(74) *Attorney, Agent, or Firm* — GLOBAL IP COUNSELORS, LLP (57) ABSTRACT

A work machine including a vehicle body, a traveling wheel, first and second steering members, an actuator, first and second operation sensors that output operation signals indicative of operation of the first and second steering members, and a controller. The controller acquires the first and second operation signals. The controller determines whether or not the first steering member is being operated, and whether the first steering member was operated last. The controller performs an automatic control of the actuator to set the steering angle to a target angle upon determining that the first steering member is not being operated and the first steering member was operated last. The controller does not perform the automatic control upon determining that the second steering member was operated last even if the first steering member is not being operated.

14 Claims, 7 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 9,428,884 | B2* | 8/2016 | Sharma | B62D 9/00 |
| 2008/0116000 | A1* | 5/2008 | Huang | B62D 6/02 |
| | | | | 180/235 |
| 2008/0208461 | A1* | 8/2008 | Gharsalli | G05D 1/0278 |
| | | | | 701/425 |
| 2013/0192919 | A1* | 8/2013 | Subrt | B62D 6/002 |
| | | | | 180/400 |
| 2014/0182277 | A1* | 7/2014 | Kuipers | B62D 9/00 |
| | | | | 60/327 |
| 2015/0066298 | A1* | 3/2015 | Sharma | E02F 9/0841 |
| | | | | 701/41 |
| 2019/0071115 | A1* | 3/2019 | Brooks | B62D 7/1509 |
| 2020/0299930 | A1 | 9/2020 | Wuisan et al. | |
| 2021/0270012 | A1* | 9/2021 | Sumiya | E02F 3/764 |
| 2022/0298749 | A1* | 9/2022 | Sonoda | B62D 6/04 |
| 2022/0325499 | A1* | 10/2022 | Sonoda | E02F 3/841 |

FOREIGN PATENT DOCUMENTS

| | | |
|---|---|---|
| JP | 2021-54269 A | 4/2021 |
| JP | 2021-54270 A | 4/2021 |

\* cited by examiner

WORK MACHINE AND METHOD FOR CONTROLLING WORK MACHINE

CROSS-REFERENCE TO RELATED APPLICATIONS

This application is a U.S. National stage application of International Application No. PCT/JP2022/020619, filed on May 18, 2022. This U.S. National stage application claims priority under 35 U.S.C. § 119(a) to Japanese Patent Application No. 2021-117774, filed in Japan on Jul. 16, 2021, the entire contents of which are hereby incorporated herein by reference.

BACKGROUND

Field of the Invention

The present invention relates to a work machine and a method for controlling the work machine.

Background Information

There is a work machine that includes a plurality of steering members for steering traveling wheels to the left or right. For example, the work machine in Japanese Patent Laid-open No. 2021-054269 includes a steering lever and a steering wheel. The operator of the work machine operates the steering members whereby the work machine changes the steering angle of the traveling wheels to the left or right. Consequently, the work machine turns to the left or right.

A work machine may easily deviate from a target route due to a load caused by earth and sand during traveling or due to an uneven road surface. As a result, the operator is required to operate the steering member for maintaining the route while operating the work implement such as a blade at the same time. Such type of operation is difficult and the operating load on the operator is large.

Accordingly, Japanese Patent Laid-open No. 2021-054269 discloses a steering automatic control for automatically controlling the steering angle so that the work machine maintains the traveling direction. In this steering automatic control, the orientation of the work machine when the operating of the steering lever is stopped is determined as the traveling direction. The steering angle is automatically controlled so that the work machine travels straight in the traveling direction.

SUMMARY

In the abovementioned work machine, automatic control of the steering angle is performed when the operator stops the operation of the steering wheel (handle bar) or the steering lever. As a result, the automatic control may be performed due to the operator removing his hand from the steering wheel after having operated the steering wheel. In this case, after the operation of the steering wheel, the steering angle is automatically changed even though the steering wheel is not operated which increases the feeling of unease in the driving feeling for the operator. An object of the present invention is to lighten the operating load on the operator due to the automatic control of the steering angle and suppress the feeling of unease of the operator due to the automatic control in the work machine.

A work machine according to a first aspect of the present invention includes a vehicle body, a traveling wheel, a first steering member, a second steering member, an actuator, a first operation sensor, a second operation sensor, and a controller. The traveling wheel is supported by the vehicle body. The first steering operating member is operable by an operator. The second steering operating member is operable by the operator. The second steering member is separate from the first steering member. The actuator changes the steering angle of the traveling wheel in response to an operation of the first steering member. The actuator changes the steering angle in response to an operation of the second steering member. The first operation sensor outputs a first operation signal that indicates the operation of the first steering member. The second operation sensor outputs a second operation signal that indicates the operation of the second steering member. The controller acquires the first operation signal and the second operation signal.

The controller determines whether or not the first steering member has been operated. The controller determines whether the first steering member has been operated last among the first steering member and the second steering member. The controller performs automatic control for controlling the actuator so as to set the steering angle to a predetermined target angle upon determining that the first steering member is not being operated and has been operated last among the first steering member and the second steering member. The controller does not perform the automatic control upon determining that the second steering member has been operated last among the first steering member and the second steering member even if the first steering member is not being operated.

A method according to another aspect of the present invention is a method for controlling a work machine. The work machine includes a vehicle body, a traveling wheel, and an actuator. The traveling wheel is supported by the vehicle body. The actuator changes the steering angle of the traveling wheel. The method according to the present aspect comprises: acquiring a first operation signal that indicates an operation of a first steering member that is operable to change the steering angle; acquiring a second operation signal that indicates an operation of a second steering member separate from the first steering member and that is operable to change the steering angle; determining whether or not the first steering member is being operated; determining whether the first steering member was operated last among the first steering member and the second steering member; performing an automatic control for controlling the actuator so as to set the steering angle to a predetermined target angle upon determining that the first steering member is not being operated and the first steering member was operated last among the first steering member and the second steering member; and not performing the automatic control upon determining that the second steering member was operated last among the first steering member and the second steering member even if the first steering member is not being operated.

According to the present invention, the automatic control is performed when the first steering member is not being operated and the first steering member was operated last. As a result, the operating load on the operator is lightened due to the automatic control. The automatic control is not performed upon determining that the second steering member has been operated last even if the first steering member is not being operated. As a result, the operator is able to cause the work machine to travel without interference by the automatic control. Consequently, the feeling of unease of the operator due to the automatic control is suppressed.

DETAILED DESCRIPTION OF EMBODIMENT(S)

Figure 1:
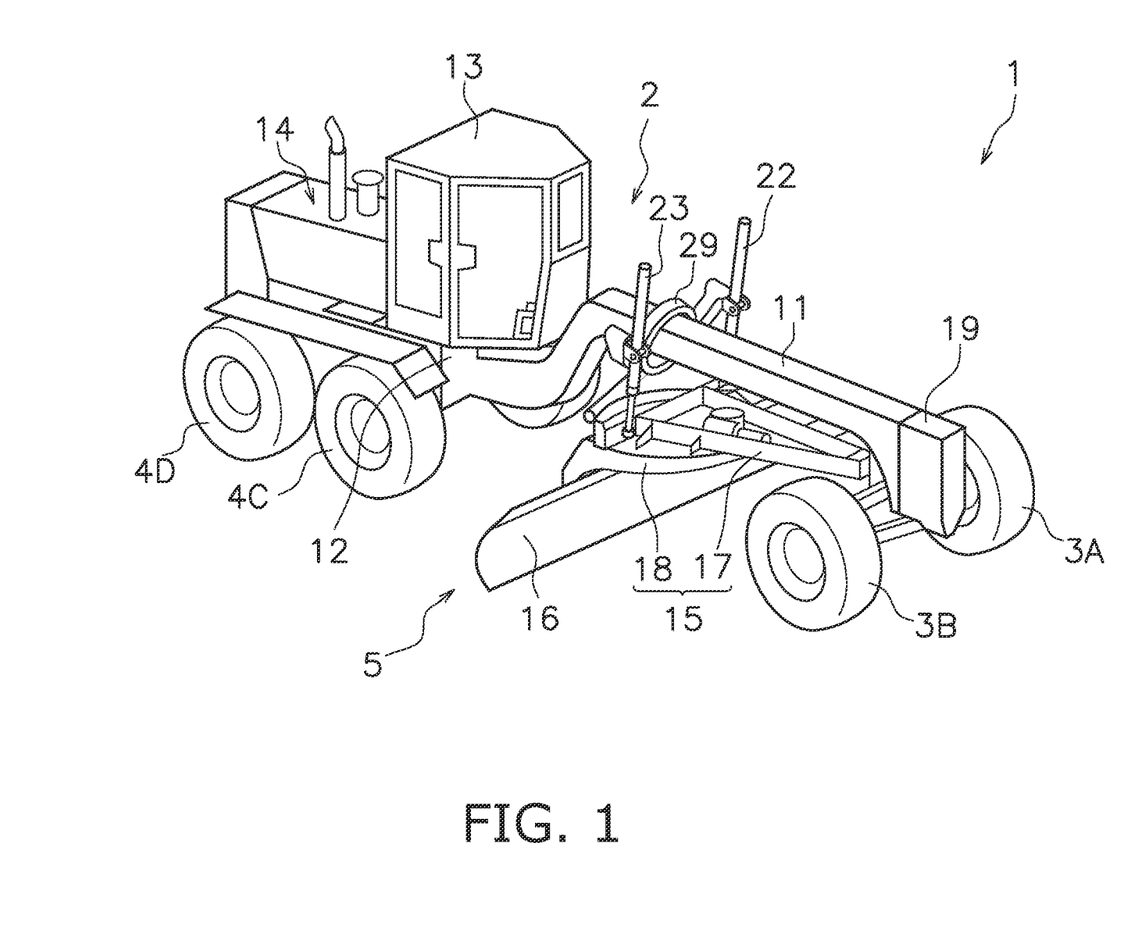
FIG. 1 is a perspective view of a work machine according to an embodiment.
Figure 2:
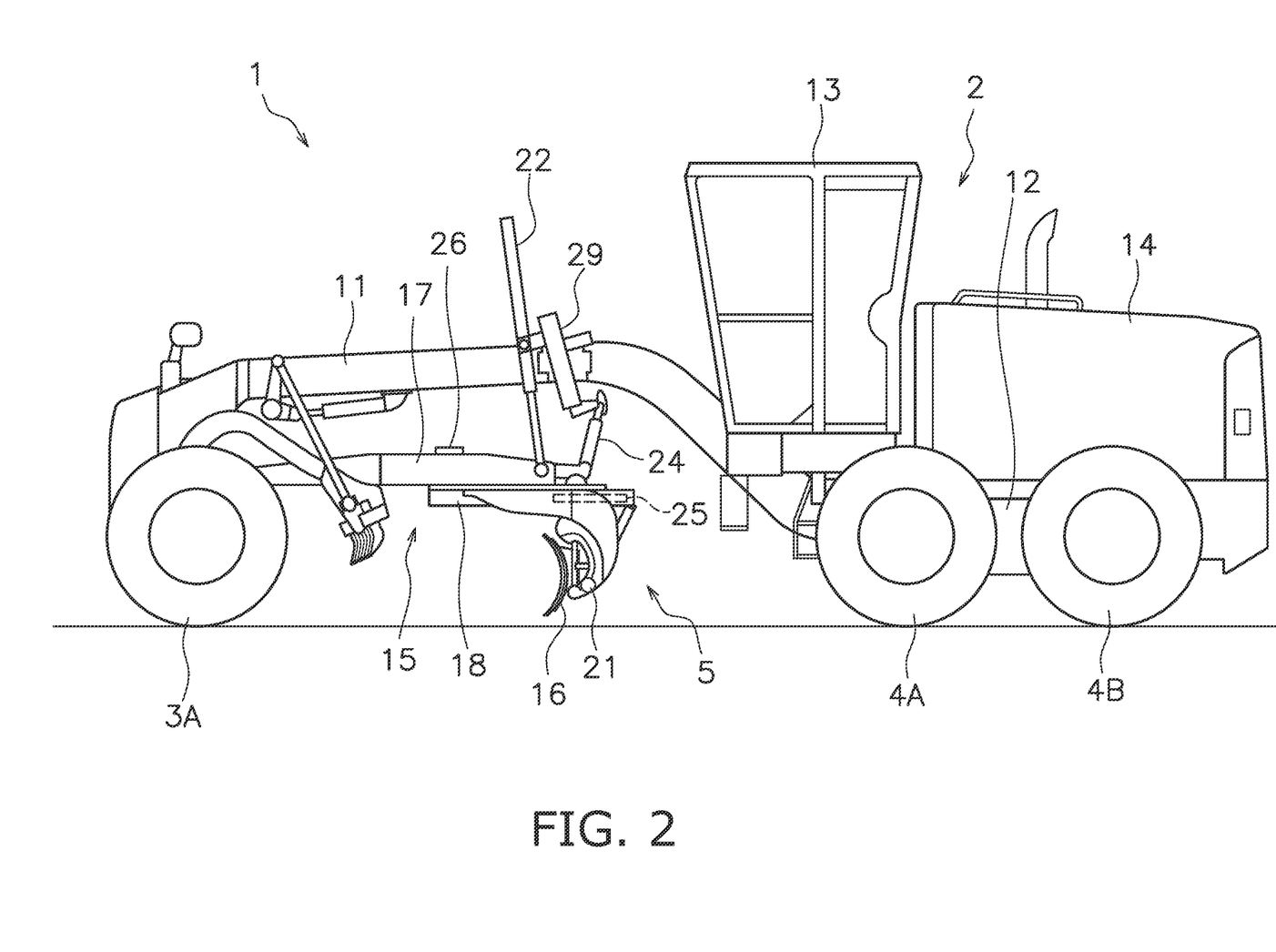
FIG. 2 is a side view of the work machine.

An embodiment of the present invention will be described below with reference to the drawings. FIG. 1 is a perspective view of a work machine 1 according to the embodiment. FIG. 2 is a side view of the work machine 1. As illustrated in FIG. 1, the work machine 1 includes a vehicle body 2, front wheels 3A and 3B, rear wheels 4A to 4D, and a work implement 5. The vehicle body 2 includes a front frame 11, a rear frame, 12, a cab 13, and a power chamber 14.

The rear frame 12 is connected to the front frame 11. The front frame 11 is able to articulate to the left and right with respect to the rear frame 12. In the following explanation, the front, rear, left, and right directions signify the front, rear, left, and right directions of the vehicle body 2 while the articulate angle is zero, that is, while the front frame 11 and the rear frame 12 are straight.

The cab 13 and the power chamber 14 are disposed on the rear frame 12. An unillustrated operator's seat is disposed in the cab 13. The power chamber 14 is disposed behind the cab 13. The front frame 11 extends forward from the rear frame 12. The front wheels 3A and 3B are attached to the front frame 11. The rear wheels 4A to 4D are attached to the rear frame 12.

The work implement 5 is movably connected to the vehicle body 2. The work implement 5 includes a supporting member 15 and a blade 16. The supporting member 15 is movably connected to the vehicle body 2. The supporting member 15 supports the blade 16. The supporting member 15 includes a drawbar 17 and a circle 18. The drawbar 17 is disposed below the front frame 11.

The drawbar 17 is connected to a front part 19 of the front frame 11. The drawbar 17 extends rearward from the front part 19 of the front frame 11. The drawbar 17 is swingably supported at least in the up-down direction and the left-right direction of the vehicle body 2 with respect to the front frame 11. For example, the front part 19 includes a ball joint. The drawbar 17 is rotatably connected to the front frame 11 via the ball joint.

The circle 18 is connected to a rear part of the drawbar 17. The circle 18 is rotatably supported with respect to the drawbar 17. The blade 16 is connected to the circle 18. The blade 16 is supported by the drawbar 17 via the circle 18. As illustrated in FIG. 2, the blade 16 is supported by the circle 18 so as to be rotatable about a tilt shaft 21. The tilt shaft 21 extends in the left-right direction.

The work machine 1 includes a plurality of actuators 22 to 26 for changing the orientation of the work implement 5. The plurality of actuators 22 to 26 include a plurality of hydraulic cylinders 22 to 25. The plurality of hydraulic cylinders 22 to 25 are connected to the work implement 5. The plurality of hydraulic cylinders 22 to 25 extend and contract due to hydraulic pressure. The plurality of hydraulic cylinders 22 to 25 change the orientation of the work implement 5 with respect to the vehicle body 2 by extending and contracting. In the following explanation, the extension and contraction of the hydraulic cylinders is referred to as a "stroke motion."

Specifically, the plurality of hydraulic cylinders 22 to 25 include a left lift cylinder 22, a right lift cylinder 23, a drawbar shift cylinder 24, and a blade tilt cylinder 25. The left lift cylinder 22 and the right lift cylinder 23 are disposed away from each other in the left-right direction. The left lift cylinder 22 and the right lift cylinder 23 are connected to the drawbar 17. The left lift cylinder 22 and the right lift cylinder 23 are connected to the front frame 11 via a lifter bracket 29. The drawbar 17 swings up and down due to the stroke motions of the left lift cylinder 22 and the right lift cylinder 23. As a result, the blade 16 moves up and down.

The drawbar shift cylinder 24 is connected to the drawbar 17 and the front frame 11. The drawbar shift cylinder 24 is connected to the front frame 11 via the lifter bracket 29. The drawbar shift cylinder 24 extends diagonally downward from the front frame 11 toward the drawbar 17. The drawbar 17 swings left and right due to the stroke motions of the drawbar shift cylinder 24. The blade tilt cylinder 25 is connected to the circle 18 and the blade 16. The blade 16 rotates about the tilt shaft 21 due to the stroke motions of the blade tilt cylinder 25.

The plurality of actuators 22 to 26 include a rotation actuator 26. The rotation actuator 26 is connected to the drawbar 17 and the circle 18. The rotation actuator 26 causes the circle 18 to rotate with respect to the drawbar 17. Consequently, the blade 16 rotates about a rotating axis that extends in the up-down direction.

Figure 3:
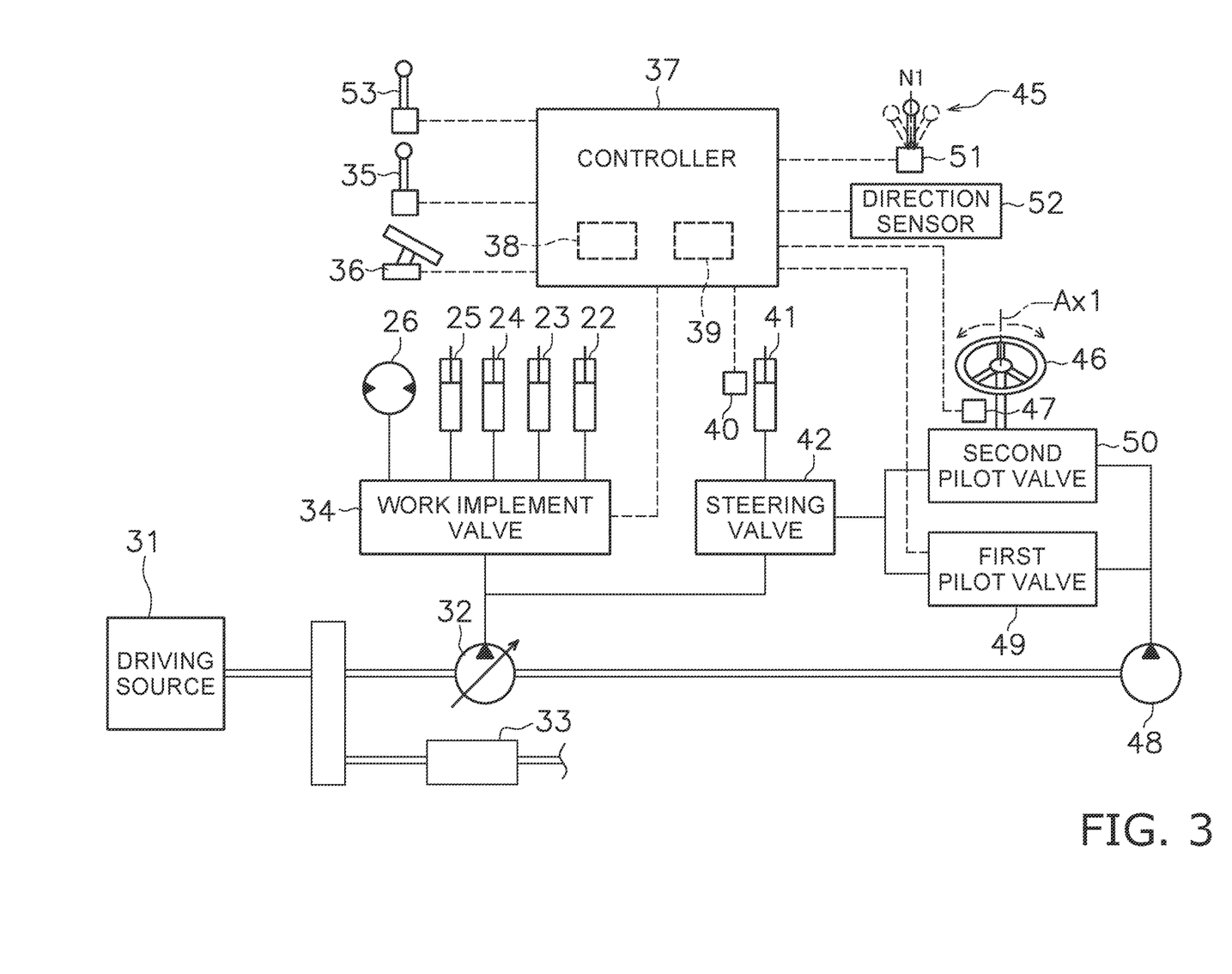
FIG. 3 is a schematic view of a configuration of the work machine.

FIG. 3 is a schematic view illustrating a configuration of the work machine 1. As illustrated in FIG. 3, the work machine 1 includes a driving source 31, a first hydraulic pump 32, a power transmission device 33, and a work implement valve 34. The driving source 31 is, for example, an internal combustion engine. Alternatively, the driving source 31 may be an electric motor or a hybrid of an internal combustion engine and an electric motor. The first hydraulic pump 32 is driven by the driving source 31 thereby discharging hydraulic fluid.

The control valve 34 is connected to the first hydraulic pump 32 and the plurality of hydraulic cylinders 22 to 25 via a hydraulic circuit. The control valve 34 includes a plurality of valves connected to each of the plurality of hydraulic cylinders 22 to 25. The control valve 34 controls the flow rate of the hydraulic fluid supplied from the first hydraulic pump 32 to the plurality of hydraulic cylinders 22 to 25. The work implement valve 34 is, for example, an electromagnetic proportional control valve. Alternatively, the work implement valve 34 may be a hydraulic pilot-type proportional control valve.

In the present embodiment, the rotation actuator 26 is a hydraulic motor. The work implement valve 34 is connected to the first hydraulic pump 32 and the rotation actuator 26 via the hydraulic circuit. The work implement control valve 34 controls the flow rate of hydraulic fluid supplied from the first hydraulic pump 32 to the rotation actuator 26. The rotation actuator 26 may be an electric motor.

The power transmission device 33 transmits the driving power from the driving source 31 to the rear wheels 4A to 4D. The power transmission device 33 may include a torque converter and/or a plurality of speed change gears. Alternatively, the power transmission device 33 may be a transmission of another type such as a hydraulic static transmission (HST) or a hydraulic mechanical transmission (HMT).

The work machine 1 includes a work implement operating member 35, a shift member 53, an accelerator operating member 36, and a controller 37. The work implement operating member 35 is operable by an operator in order to change the orientation of the work implement 5. The work implement operating member 35 includes, for example, a plurality of operating levers. Alternatively, the work implement operating member 35 may be another member such as a switch or a touch screen. The work implement operating member 35 outputs signals indicating the operations of the work implement operating member 35 by the operator.

The shift member 53 is operable by the operator for switching between forward travel and reverse travel of the work machine 1. The shift member 53 includes, for example, a shift lever. Alternatively, the shift member 53 may be another member such as a switch or a touch screen. The shift member 53 outputs signals indicating the operations of the shift member 53 by the operator. The accelerator operating member 36 is operable by an operator for causing the work machine 1 to travel. The accelerator operating member 36 includes, for example, an accelerator pedal. Alternatively, the accelerator operating member 36 may be another member such as a switch or a touch screen. The accelerator operating member 36 outputs signals indicating the operations of the accelerator operating member 36 by the operator.

The controller 37 switches between forward travel and reverse travel of the work machine 1 by controlling the power transmission device 33 in response to the operation of the shift member 53. Alternatively, the shift member 53 may be mechanically connected to the power transmission device 33. The action of the shift member 53 is mechanically transmitted to the power transmission device 33 whereby the gears for forward travel and reverse travel of the power transmission device 33 may be switched.

The controller 37 causes the work machine 1 to travel by controlling the driving source 31 and the power transmission device 33 in response to an operation on the accelerator operating member 36. The controller 37 also actuates the work implement 5 by controlling the first hydraulic pump 32 and the work implement valve 34 in response to an operation on the work implement operating member 35.

The controller 37 includes a storage device 38 and a processor 39. The processor 39 is, for example, a CPU and executes a program for controlling the work machine 1. The storage device 38 includes a memory such as a RAM or a ROM, and an auxiliary storage device such as an SSD or an HDD. The storage device 38 stores programs and data for controlling the work machine 1.

The work machine 1 includes a direction sensor 52. The direction sensor 52 detects the traveling direction of the vehicle body 2. The direction sensor 52 outputs direction signals indicating the traveling direction of the vehicle body 2. The controller 37 acquires the traveling direction of the vehicle body 2 from the direction signals from the direction sensor 52. The traveling direction of the vehicle body 2 is represented, for example, by the yaw angle of the vehicle body 2. The direction sensor 52 is, for example, an inertial measurement device (IMU). The controller 37 calculates the traveling direction of the vehicle body 2 based on the acceleration and the angular speed of the vehicle body 2. Alternatively, the direction sensor 52 may be a global navigation satellite system (GNSS) receiver such as a global positioning system (GPS) device. The controller 37 may acquire the traveling direction of the vehicle body 2 from a change in the position of the work machine 1 detected by the direction sensor 52.

As illustrated in FIG. 3, the work machine 1 includes a steering angle sensor 40, a steering actuator 41, and a steering valve 42. The steering actuator 41 is a hydraulic cylinder. The steering actuator 41 extends and contracts with hydraulic fluid from the first hydraulic pump 32. The steering actuator 41 steers the front wheels 3A and 3B by extending and contracting.

Figure 4:
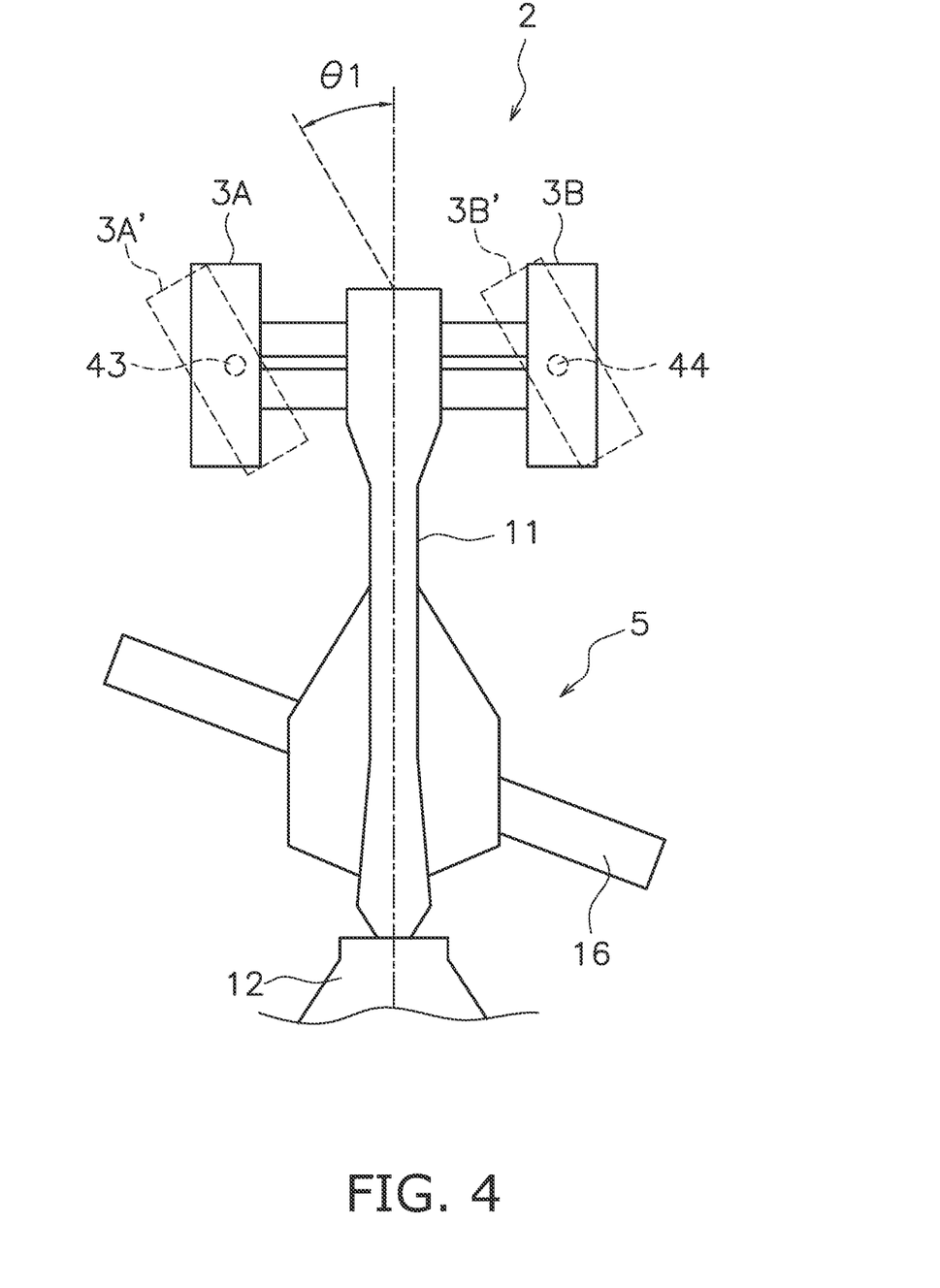
FIG. 4 is a top view of a front part of the work machine.

FIG. 4 is a top view of a front part of the work machine 1. As illustrated in FIG. 4, the front wheels 3A and 3B include a first front wheel 3A and a second front wheel 3B. The first front wheel 3 and the second front wheel 3B are disposed away from each other in the left-right direction. The first front wheel 3A is supported by the front frame 11 so as to be rotatable about a first steering shaft 43. The second front wheel 3B is supported by the front frame 11 so as to be rotatable about a second steering shaft 44. The first steering shaft 43 and the second steering shaft 44 extend in the up-down direction.

The steering actuator 41 is connected to the front wheels 3A and 3B and the front frame 11. The steering actuator 41 changes a steering angle $\theta 1$ of the front wheels 3A and 3B from a predetermined neutral angle to the left or right. As illustrated in FIG. 4, the steering angle $\theta 1$ is the angle that the front wheels 3A and 3B face with respect to the front-back direction of the work machine 1. The front-back direction of the work machine 1 signifies the front-back direction of the front frame 11. However, the front-back direction of the work machine 1 may signify the front-back direction of the rear frame 12.

The neutral angle is a steering angle $\theta 1$ of zero degrees. Therefore, when the steering angle $\theta 1$ is the neutral angle, the front wheels 3A and 3B are facing straight forward of the work machine 1. In FIG. 4, 3A' represents the first front wheel 3 that has been steered from the neutral angle to the left by the steering angle $\theta 1$. 3B' represents the second front wheel 3B that has been steered from the neutral angle to the left by the steering angle $\theta 1$.

The steering valve 42 is connected through the hydraulic circuit to the first hydraulic pump 32 and the steering actuator 41. The steering valve 42 controls the flow rate of hydraulic fluid supplied from the first hydraulic pump 32 to the steering actuator 41. The steering valve 42 is, for example, a hydraulic pilot type of control valve.

The steering angle sensor 40 detects the steering angle $\theta 1$. The steering angle sensor 40 outputs an angle signal indicating the steering angle $\theta 1$. The controller 37 acquires the current steering angle $\theta 1$ from the angle signal from the steering angle sensor 40. The steering angle sensor 40 detects, for example, the stroke amount of the steering actuator 41. The steering angle $\theta 1$ is calculated from the stroke amount of the steering actuator 41. Alternatively, the steering angle sensor 40 may detect the steering angle $\theta 1$ directly.

The work machine 1 includes a first steering member 45 and a second steering member 46. The first steering member 45 and the second steering member 46 is operable by the operator for changing the steering angle $\theta 1$ of the front wheels 3A and 3B to the left or right. The first steering member 45 is a lever such as a joy stick. Alternatively, the first steering member 45 may be a member other than a lever. The first steering member 45 can be tilted to the left and right from a neutral position N1. The first steering member 45 is connected to a first operation sensor 51. The first operation sensor 51 outputs a first operation signal that indicates an operation on the first steering member 45 by the operator. The controller 37 acquires the operating amount of the first steering member 45 from the first operation signal from the first operation sensor 51.

The second steering member 46 is a steering wheel. Alternatively, the second steering member 46 may be a member other than a steering wheel. The second steering member 46 is rotatable about a rotation axis Ax1. A second operation sensor 47 is attached to the second steering member 46. The second operation sensor 47 outputs a second operation signal that indicates an operation on the second steering member 46 by the operator. For example, the second operation sensor 47 detects the angular displacement about the rotation axis Ax1 of the second steering member 46. The controller 37 acquires the operating amount of the second steering member 46 from the second operation signal from the second operation sensor 47. The second steering member 46 is held in the last operated position when not operated by the operator.

The work machine 1 includes a second hydraulic pump 48, a first pilot valve 49, and a second pilot valve 50. The second hydraulic pump 48 is driven by the driving source 31 thereby discharging hydraulic fluid. The first pilot valve 49 is connected through the hydraulic circuit to the second hydraulic pump 48 and the steering valve 42. The first pilot valve 49 controls the pressure of the hydraulic fluid supplied from the second hydraulic pump 48 to the pilot port of the steering valve 42. The first pilot valve 49 is an electromagnetic proportional control valve.

The first pilot valve 49 is controlled by signals from the controller 37. The controller 37 controls the first pilot valve 49 in response to the first operation signals from the first operation sensor 51, thereby extending and contracting the steering actuator 41. Consequently, the controller 37 controls the steering actuator 41 so as to change the steering angle θ1 of the front wheels 3A and 3B in response to the operation of the first steering member 45. The control of the steering angle θ1 by means of the first steering member 45 is discussed in detail below.

The second pilot valve 50 is connected through the hydraulic circuit to the second hydraulic pump 48 and the steering valve 42. The second pilot valve 50 is connected to the second steering member 46. The second pilot valve 50 controls the pressure of the hydraulic fluid supplied from the second hydraulic pump 48 to the pilot port of the steering valve 42 in response to the operation of the second steering member 46. Consequently, the steering actuator 41 changes the steering angle θ1 of the front wheels 3A and 3B so that the steering angle θ1 of the front wheels 3A and 3B becomes the angle corresponding to the operating amount of the second steering member 46.

When the operating amount of the second steering member 46 is held in a constant manner, the steering actuator 41 holds the steering angle θ1 of the front wheels 3A and 3B at the angle corresponding to the operating amount of the second steering member 46. The second pilot valve 50 may also be an electromagnetic proportional control valve, similar to the first pilot valve 49. In this case, the controller 37 may control the second pilot valve 50 in accordance with the operation of the second steering member 46.

Next, the control of the steering angle θ1 by means of the first steering member 45 is discussed. The controller 37 refers to steering speed data and determines a target steering speed from the operating amount of the first steering member 45. The controller 37 controls the steering actuator 41 so that the steering angle θ1 changes at the target steering speed. The steering speed data prescribes the target steering speed with respect to the operating amount of the first steering member 45.

Figure 5:
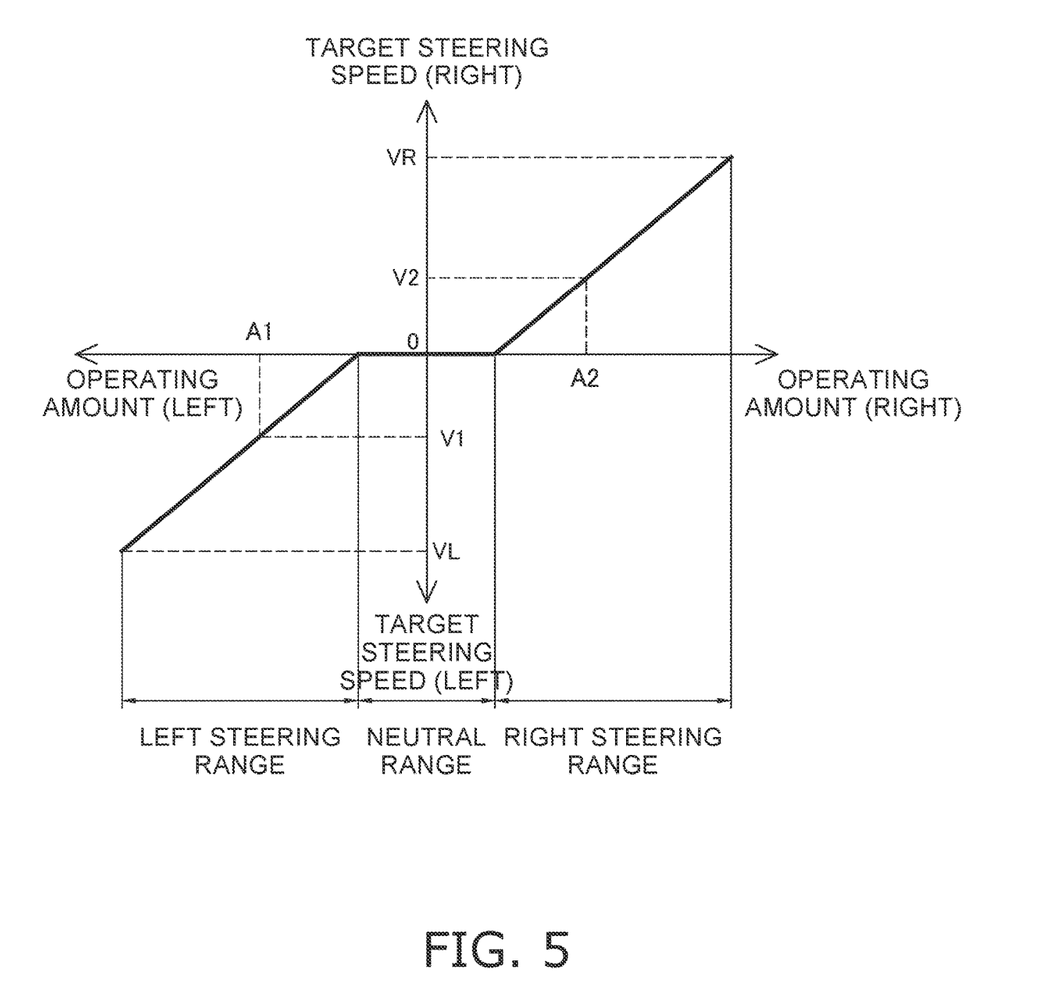
FIG. 5 illustrates an example of steering speed data.

FIG. 5 illustrates an example of the steering speed data. As illustrated in FIG. 5, the first steering member 45 is operable within a neutral range, a left steering range, and a right steering range. The neutral range is a range that includes the position of the first steering member 45 at the operating amount 0, that is, the range includes the neutral position N1. The neutral range is positioned between the left steering range and the right steering range. The left steering range is positioned to the left of the neutral range. The right steering range is positioned to the right of the neutral range.

The steering speed data prescribes the target steering speed to the left that increases from 0 to the maximum speed VL to the left in response to an increase in the operating amount to the left of the first steering member 45 within the left steering range. Therefore, the controller 37 controls the steering actuator 41 so as to change the steering angle θ1 of the front wheels 3A and 3B to the left at a speed that corresponds to the operating amount of the first steering member 45 when the first steering member 45 is positioned in the left steering range.

For example, when the first steering member 45 is operated by an operating amount A1 to the left, the controller 37 determines a steering speed V1 corresponding to the operating amount A1 as the target steering speed. The controller 37 then controls the steering actuator 41 so as to change the steering angle θ1 of the front wheels 3A and 3B to the left at the steering speed V1. Additionally, the steering angle θ1 of the front wheels 3A and 3B continues to change to the left at the steering speed V1 until reaching the maximum steering angle to the left while the first steering member 45 is held at the operating amount A1 to the left.

The steering speed data prescribes the target steering speed to the right that increases from 0 to the maximum speed VR to the right in response to an increase in the operating amount to the right of the first steering member 45 within the right steering range. Therefore, the controller 37 controls the steering actuator 41 so as to change the steering angle θ1 of the front wheels 3A and 3B to the right at a speed that corresponds to the operating amount of the first steering member 45 when the first steering member 45 is positioned in the right steering range.

For example, when the first steering member 45 is operated by an operating amount A2 to the right, the controller 37 determines a steering speed V2 corresponding to the operating amount A2 as the target steering speed. The controller 37 then controls the steering actuator 41 so as to change the steering angle θ1 of the front wheels 3A and 3B to the right at the steering speed V2. Additionally, the steering angle θ1 of the front wheels 3A and 3B continues to change to the right at the steering speed V2 until reaching the maximum steering angle to the right while the first steering member 45 is held at the operating amount A2 to the right.

The controller 37 controls the steering actuator 41 so that when the first steering member 45 is positioned in the neutral range, the steering angle θ1 is held at the neutral angle. For example, when the first steering member 45 is positioned in the neutral range while the steering angle θ1 is the neutral angle, the steering angle θ1 is not changed and is held at the neutral angle.

When the first steering member 45 and the second steering member 46 are operated at the same time, the controller 37 prioritizes the operation of the second steering member 46. Therefore, when the first steering member 45 and the second steering member 46 are operated at the same time, the controller 37 does not perform the abovementioned control of the steering angle θ1 through the first steering member 45. As a result, the steering angle θ1 changes in response to the operation of the second steering member 46.

The automatic control of the steering angle θ1 is explained next. The controller 37 performs automatic control for controlling the steering actuator 41 so that the steering angle θ1 becomes a predetermined target angle. The automatic control includes a center return mode and a steering stabilizer mode.

In the center return mode, the controller 37 controls the steering actuator 41 so that the steering angle θ1 automatically returns to the neutral angle when the first steering member 45 is returned from the left steering range or the right steering range to the neutral range.

For example, when the steering angle θ1 is a predetermined angle to the left, the controller 37 controls the steering actuator 41 so that the steering angle θ1 returns from the predetermined angle to the left to the neutral angle when the first steering member 45 is returned to the neutral range. When the steering angle θ1 is a predetermined angle to the right, the controller 37 controls the steering actuator 41 so that the steering angle θ1 returns from the predetermined angle to the right to the neutral angle when the first steering member 45 is returned to the neutral range.

Figure 6:
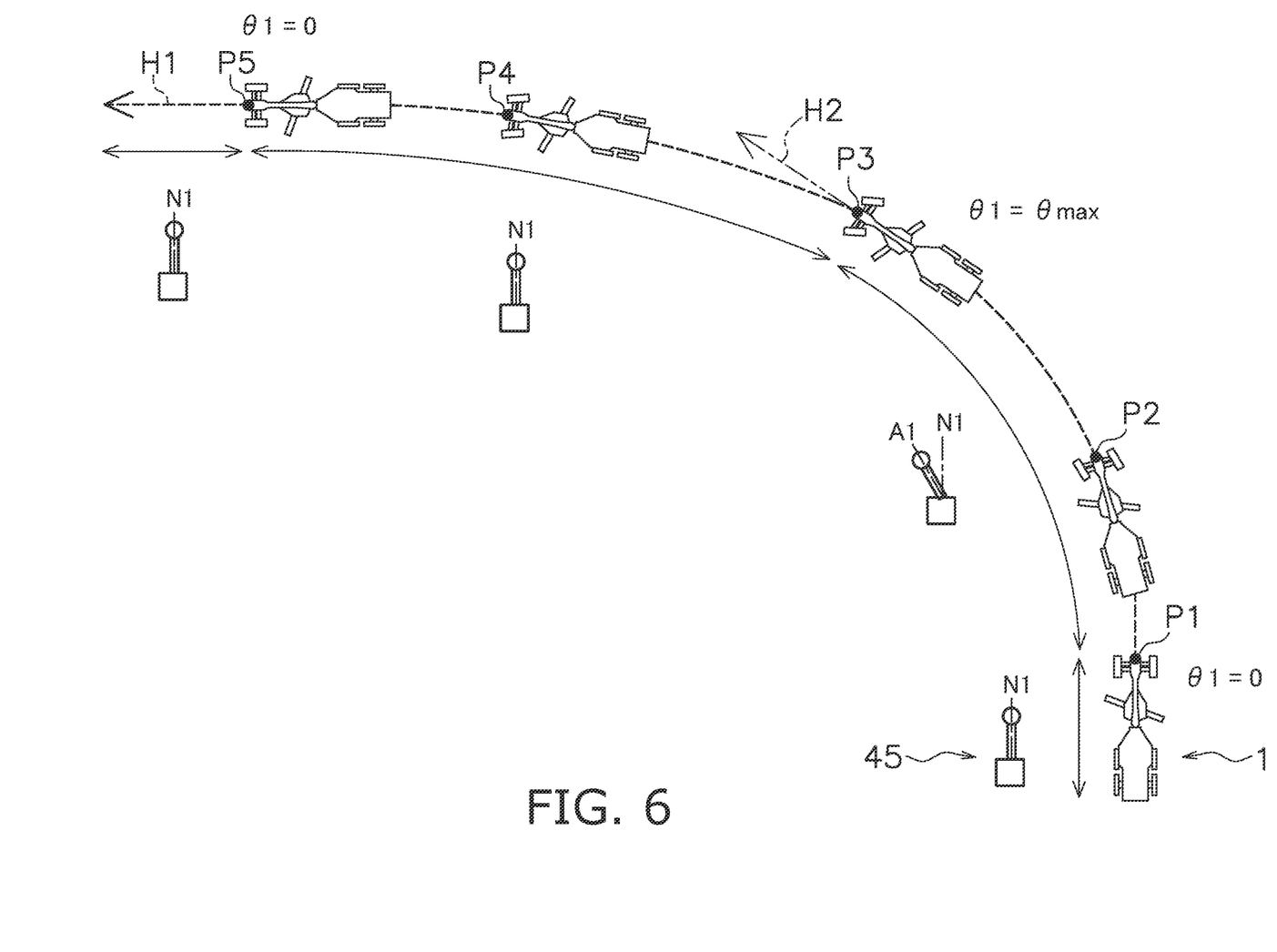
FIG. 6 illustrates an example of travel of the work machine due to an operation of a first steering member.

FIG. 6 illustrates an example of travel of the work machine 1 due to an operation on the first steering member 45. As illustrated in FIG. 6, the first steering member 45 is positioned at the neutral position N1 while the work machine 1 is at the point P1. The steering angle θ1 is the neutral angle and the work machine 1 travels straight forward. At the point P2, the steering angle θ1 of the front wheels 3A and 3B begins to change from the neutral angle to the left when the operator operates the first steering member 45 by the operating amount A1 within the left steering range. Consequently, the work machine 1 turns to the left.

When the operator holds the first steering member 45 at the operating amount A1 between the point P2 and the point P3, the steering angle θ1 of the front wheels 3A and 3B continues to increase up to the maximum steering angle θmax to the left. Consequently, the work machine 1 continues to turn to the left.

When the operator returns the first steering member 45 to the neutral range at the point P3, the steering angle θ1 of the front wheels 3A and 3B decreases from the maximum steering angle θmax toward the neutral angle due to the center return mode. At the point P5, the steering angle θ1 of the front wheels 3A and 3B then returns to the neutral angle.

In the steering stabilizer mode, the controller 37 controls the steering angle θ1 so that the traveling direction of the vehicle body 2 is held in the target direction. As illustrated in FIG. 6, after the operator has returned the first steering member 45 to the neutral range at the point P3, the controller 37 determines whether the steering angle θ1 has returned to the neutral angle. The controller 37 determines that the steering angle θ1 has returned to the neutral angle at the point P5. The controller 37 determines the traveling direction H1 of the vehicle body 2 when the steering angle θ1 has been determined as having returned to the neutral angle, as the target direction. Thereafter, the controller 37 controls the steering actuator 41 so that the traveling direction of the vehicle body 2 is held at the target direction (H1). Consequently, the work machine 1 travels straight in the target direction (H1).

Specifically, the controller 37 determines the target angle of the steering angle θ1 based on the difference between the current traveling direction of the vehicle body 2 and the target direction. The controller 37 controls the steering actuator 41 so that the steering angle θ1 becomes the target angle. For example, the controller 37 determines the target angle of the steering angle θ1 by multiplying the difference between the current traveling direction of the vehicle body 2 and the target direction by a predetermined gain. The controller 37 decreases the gain as the vehicle speed increases. Consequently, the target angle is decreased as the vehicle speed increases. The controller 37 controls the steering actuator 41 so that the steering angle θ1 is held at the target angle by means of feedback control.

The controller 37 may also calculate the vehicle speed from a change in the position of the work machine 1 detected by the abovementioned GNSS receiver. Alternatively, the work machine 1 may be provided with a rotation sensor that detects the output rotation speed of the power transmission device 33. The controller 37 may calculate the vehicle speed from the output rotation speed of the power transmission device 33.

Figure 7:
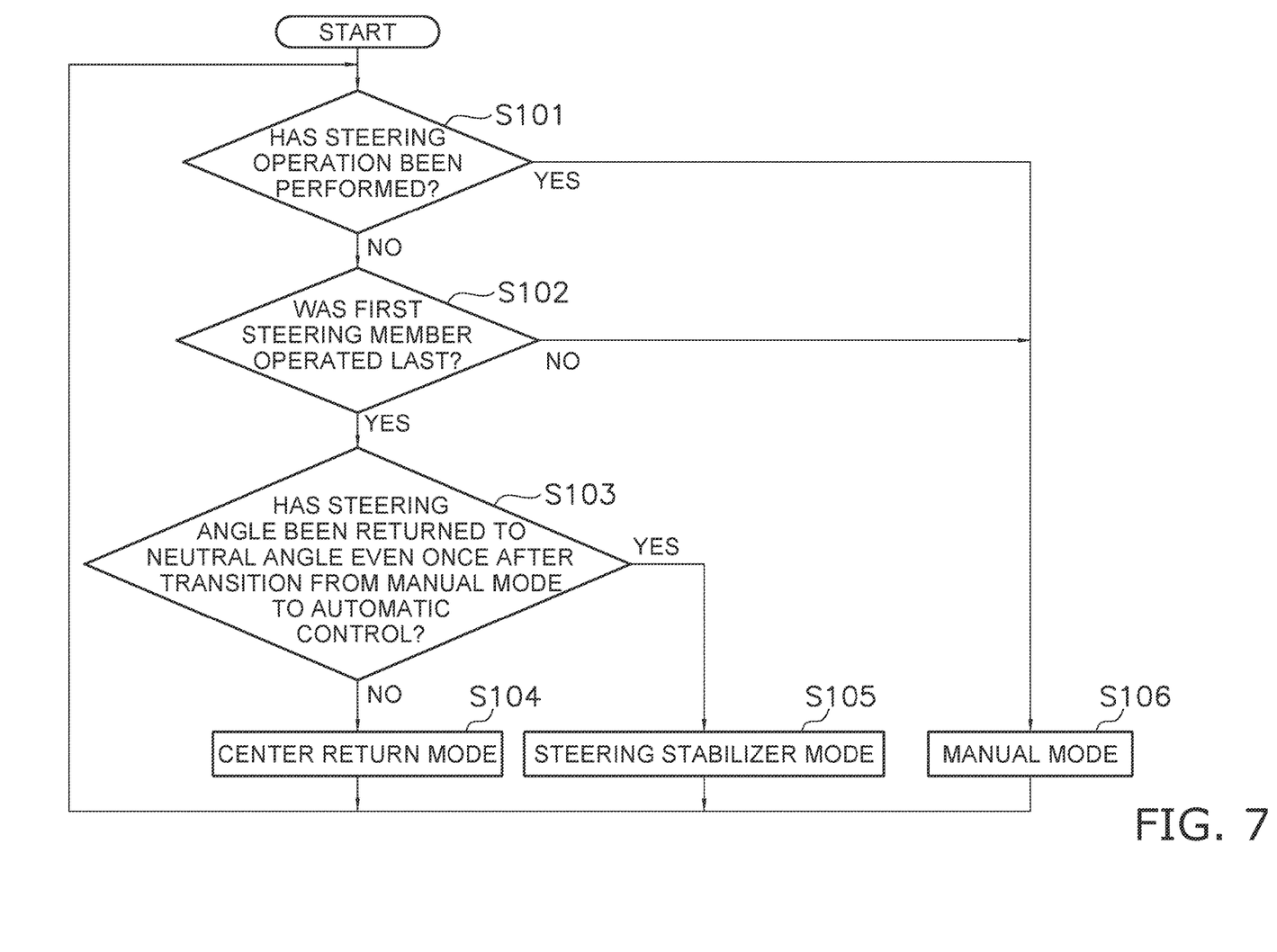
FIG. 7 is a flow chart illustrating a process for determining the start of automatic control.

FIG. 7 is a flow chart illustrating a process for determining the start of automatic control. As illustrated in FIG. 7, in step S101, the controller 37 determines whether a steering operation has been performed. The controller 37 determines that a steering operation has been performed when at least one of the first steering member 45 and the second steering member 46 has been operated.

The controller 37 determines from the first operation signal that the first steering member 45 has been operated when the first steering member 45 is positioned in the left steering range or the right steering range. The controller 37 determines from the first operation signal that the first steering member 45 has not been operated when the first steering member 45 is positioned in the neutral range.

The controller 37 acquires the operating speed of the second steering member 46 from the second operation signal. The controller 37 determines that the second steering member 46 has been operated when the operating speed is greater than a threshold. The controller 37 determines that the second steering member 46 has not been operated when the operating speed is equal to or less than the threshold. For example, the controller 37 calculates the angular speed of the second steering member 46. The controller 37 determines that the second steering member 46 has not been operated when the angular speed of the second steering member 46 is equal to or less than the threshold.

When the controller 37 has determined that a steering operation has been performed in step S101, the process advances to step S106. In step S106, the steering actuator 41 is controlled in a manual mode. That is, the controller 37 does not perform the automatic control and the steering actuator 41 is controlled in response to the operation of the first steering member 45 or the second steering member 46 by the operator as described above.

When the controller 37 has determined that a steering operation has not been performed in step S101, the process advances to step S102. In step S102, the controller 37 determines whether the first steering member 45 has been operated last among the first steering member 45 and the second steering member 46. When the controller 37 determines that the first steering member 45 has not been operated last among the first steering member 45 and the second steering member 46 in step S102, the process advances to step S106. That is, when the second steering member 46 was operated last, the controller 37 does not perform the automatic control and the steering actuator 41 is controlled in the manual mode.

When the controller 37 determines that the first steering member 45 has been operated last in step S102, the process advances to step S103. In step S103, the controller 37 determines whether the steering angle θ1 has been returned to the neutral angle even once after the transition from the manual mode to the automatic control. When the controller 37 has determined that the steering angle θ1 has not been returned to the neutral angle even once after the transition from the manual mode to the automatic control, the process advances to step S104.

In step S104, the controller 37 controls the steering actuator in the center return mode. That is, the controller 37 controls the steering actuator 41 so that the steering angle θ1 returns to the neutral angle as indicated in the actions from point P3 to point P5 in FIG. 6.

When the controller 37 has determined that the steering angle θ1 has been returned to the neutral angle even once after the transition from the manual mode to the automatic control in step S103, the process advances to step S105. In step S105, the controller 37 controls the steering actuator in the steering stabilizer mode. In the steering stabilizer mode, the controller 37 controls the steering angle θ1 so that the traveling direction of the vehicle body 2 is held in the target direction (H1) as indicated at point P5 in FIG. 6.

In the work machine 1 according to the present embodiment discussed above, the controller performs automatic control upon determining that the first steering member is not being operated and has been operated last among the first steering member and the second steering member. The controller 37 does not perform the automatic control upon determining that the second steering member has been operated last among the first steering member and the second steering member even if the first steering member is not being operated.

As a result, during the operation of the second steering member 46, the operator is able to cause the work machine 1 to travel with a natural driving feeling without interference by the automatic control. Consequently, the feeling of unease of the operator is reduced by preventing unintended interference by the automatic control. Moreover, when the operator is operating the first steering member 45, the automatic control can be started smoothly without the operation of a separate switch, etc., by stopping the operation of the first steering member 45. Consequently, the operating load of the operator can be further lightened by the automatic control.

Although an embodiment of the present invention has been described so far, the present invention is not limited to the above embodiment and various modifications may be made within the scope of the invention.

The work machine 1 is not limited to a motor grader and may be another work machine such as a wheel loader, a dump truck, or a forklift. The number of the steering actuator 41 is not limited to one and may be two or more. The steering actuator 41 is not limited to a hydraulic cylinder and may be a hydraulic motor or an electric motor.

The steering speed data is not limited to the above embodiment and may be changed. Alternatively, the center return mode may be omitted. The controller 37 in the above embodiment controls the steering actuator 41 so as to change the steering angle θ1 at a speed that corresponds to the operating amount of the first steering member 45. However, the controller 37 may control the steering actuator 41 so that the steering angle θ1 becomes an angle that corresponds to the operating amount of the first steering member 45. That is, the control of the steering angle θ1 by the first steering member 45 is not limited to a speed-based control and may also be a position-based control.

The process performed by the controller 37 in the steering stabilizer mode is not limited to that of the above embodiment and may be changed. For example, the controller 37 may determine, as the target direction, the traveling direction H2 of the vehicle body 2 when the operator has returned the first steering member 45 to the neutral range as indicated by point P3 in FIG. 6.

The automatic control is not limited to the abovementioned center return mode and the steering stabilizer mode and may be changed. For example, the automatic control may also include an automatic steering mode for causing the work machine 1 to travel according to a predetermined target route. In the automatic steering mode, the controller 37 may determine the target angle of the steering angle θ1 so that the work machine 1 moves along the target route. The target route may be input by the operator into the controller 37. The target route may be input from an external computer into the controller 37. Alternatively, the controller 37 may automatically generate the target route.

According to the present invention, the operating load on the operator can be lightened due to the automatic control of the steering angle and the feeling of unease of the operator due to the automatic control can be suppressed in the work machine.

The invention claimed is:

1. A work machine comprising:
a vehicle body;
a traveling wheel supported by the vehicle body;
a first steering member that is operable by an operator of the work machine;
a second steering member that is separate from the first steering member and that is operable by the operator;
an actuator configured to:
  change a steering angle of the traveling wheel in response to an operation of the first steering member, and
  change the steering angle of the traveling wheel in response to an operation of the second steering member;
a first operation sensor configured to output a first operation signal that indicates the operation of the first steering member;
a second operation sensor configured to output a second operation signal that indicates the operation of the second steering member; and
a controller configured to:
  acquire the first operation signal and the second operation signal,
  determine whether or not the first steering member is being operated,
  determine whether the first steering member was operated last among the first steering member and the second steering member,
  perform an automatic control to control the actuator so as to change the steering angle of the traveling wheel to a target steering angle upon determining that the first steering member is not being operated and the first steering member was operated last among the first steering member and the second steering member, and
  not perform the automatic control upon determining that the second steering member was operated last among the first steering member and the second steering member, even if the first steering member is not being operated.

2. The work machine according to claim 1, wherein the first steering member is a lever.

3. The work machine according to claim 1, wherein the second steering member is a steering wheel.

4. The work machine according to claim 1, wherein when the automatic control is performed, the controller is configured to:
- determine a target direction and a traveling direction of the vehicle body, and
- determine the target steering angle so as to hold the traveling direction of the vehicle body in the target direction.

5. The work machine according to claim 1, wherein
the first steering member is operable between a left steering range, a right steering range, and a neutral range between the left steering range and the right steering range; and
the controller is configured to determine that the first steering member is not being operated when an operating position of the first steering member is in the neutral range.

6. The work machine according to claim 1, wherein
the controller is configured to:
- determine whether the second steering member is being operated, and
- not perform the automatic control upon determining that the second steering member is being operated.

7. The work machine according to claim 6, wherein
the controller is configured to:
- detect an operating speed of the second steering member, and
- determine that the second steering member is not being operated when the operating speed is equal to or less than a threshold.

8. A method for controlling a work machine including a vehicle body, a traveling wheel supported by the vehicle body, and an actuator configured to change a steering angle of the traveling wheel, the method comprising:
- acquiring a first operation signal that indicates an operation of a first steering member that is operable to change the steering angle of the traveling wheel,
- acquiring a second operation signal that indicates an operation of a second steering member that is separate from the first steering member and that is operable to change the steering angle of the traveling wheel,
- determining whether the first steering member is being operated,
- determining whether the first steering member was operated last among the first steering member and the second steering member,
- performing an automatic control to control the actuator so as to change the steering angle of the traveling wheel to a target steering angle upon determining that the first steering member is not being operated and the first steering member was operated last among the first steering member and the second steering member, and
- not performing the automatic control upon determining that the second steering member was operated last among the first steering member and the second steering member, even if the first steering member is not being operated.

9. The method according to claim 8, wherein
the first steering member is a lever.

10. The method according to claim 8, wherein
the second steering member is a steering wheel.

11. The method according to claim 8, further comprising:
when the automatic control is performed, determining a target direction and a traveling direction of the vehicle body and determining the target steering angle so as to hold the traveling direction of the vehicle body in the target direction.

12. The method according to claim 8, wherein
the first steering member is operable between a left steering range, a right steering range, and a neutral range between the left steering range and the right steering range; and
the method further comprises determining that the first steering member is not being operated when an operating position of the first steering member is in the neutral range.

13. The method according to claim 8, further comprising:
- determining whether the second steering member is being operated; and
- not performing the automatic control upon determining that the second steering member is being operated.

14. The method according to claim 13, further comprising:
- detecting an operating speed of the second steering member; and
- determining that the second steering member is not being operated when the operating speed is equal to or less than a threshold.

* * * * *